United States Patent
Drepper

(10) Patent No.: US 11,816,061 B2
(45) Date of Patent: Nov. 14, 2023

(54) DYNAMIC ALLOCATION OF ARITHMETIC LOGIC UNITS FOR VECTORIZED OPERATIONS

(71) Applicant: RED HAT, INC., Raleigh, NC (US)

(72) Inventor: Ulrich Drepper, Grasbrumn (DE)

(73) Assignee: Red Hat, Inc., Raleigh, NC (US)

( * ) Notice: Subject to any disclaimer, the term of this patent is extended or adjusted under 35 U.S.C. 154(b) by 90 days.

(21) Appl. No.: 17/127,757

(22) Filed: Dec. 18, 2020

(65) Prior Publication Data

US 2022/0197858 A1 Jun. 23, 2022

(51) Int. Cl.
G06F 9/38 (2018.01)
G06F 15/80 (2006.01)
G06F 9/50 (2006.01)
G06F 7/57 (2006.01)

(52) U.S. Cl.
CPC ............ G06F 15/8053 (2013.01); G06F 7/57 (2013.01); G06F 9/3877 (2013.01); G06F 9/3887 (2013.01); G06F 9/5027 (2013.01)

(58) Field of Classification Search
CPC .. G06F 9/3877; G06F 9/3887; G06F 15/8053; G06F 9/30036
See application file for complete search history.

(56) References Cited

U.S. PATENT DOCUMENTS

| | | | |
|---|---|---|---|
| 7,360,064 B1* | 4/2008 | Steiss | G06F 9/3851 712/214 |
| 7,366,878 B1* | 4/2008 | Mills | G06F 9/3851 712/214 |
| 10,261,786 B2 | 4/2019 | Lacy et al. | |
| 11,042,502 B2* | 6/2021 | Park | G06F 9/30036 |
| 2014/0136816 A1* | 5/2014 | Krig | G06F 9/30036 712/15 |
| 2016/0085551 A1* | 3/2016 | Greathouse | G06F 9/3851 712/206 |
| 2016/0132338 A1* | 5/2016 | Jin | G06F 9/3802 712/206 |
| 2017/0083318 A1 | 3/2017 | Burger et al. | |
| 2019/0004807 A1* | 1/2019 | Chen | G06F 9/3875 |
| 2020/0183684 A1* | 6/2020 | Oshiyama | G06F 9/3838 |
| 2022/0083343 A1* | 3/2022 | Kesiraju | G06F 11/3419 |

* cited by examiner

*Primary Examiner* — Jacob Petranek
(74) *Attorney, Agent, or Firm* — Lowenstein Sandler LLP

(57) ABSTRACT

A system includes a processing device that includes a vector arithmetic logic unit comprising a plurality of arithmetic logic units (ALUs), and a first processor core operatively coupled to the vector arithmetic logic unit, the processing device to receive a first vector instruction from the first processor core, wherein the first vector instruction specifies at least one first input vector having a first vector length, identify a first subset of the ALUs in view of the first vector length and one or more allocation criteria, execute, using the first subset of the set of ALUs, one or more first ALU operations specified by the first vector instruction, wherein the vector arithmetic logic unit executes the first ALU operations in parallel with one or more second ALU operations specified by a second vector instruction received from a second processor core.

20 Claims, 8 Drawing Sheets

500

510
Receive a first vector instruction from a program executing on a first core of a processor, the first vector instruction associated with a first vector length that specifies a first number of elements in the first vector

520
Receive a second vector instruction from a second core of the processor, the second vector instruction associated with a second vector length that specifies a second number of elements in the second vector, wherein the processor comprises a vector logic unit, and the vec.tor logic unit comprises a set of arithmetic logic units (ALUs).

530
Determine, in view of the first vector length and the second vector length, a first number of ALUs of the vector logic unit, wherein the first number of ALUs corresponds to a first subset of the set of ALUs

540
Determine, in view of the first vector length and the second vector length, a second number of ALUs of the vector logic unit, wherein the second number of ALUs corresponds to a second subset of the set of ALUs, wherein the first and second sets are disjoint, and wherein a sum of the first and second numbers of ALUs is less than or equal to a total number of ALUs in the set of ALUs

550
Perform one or more first vector operations specified by the first vector instruction using the first number of ALUs of the vector logic unit, wherein the first vector operations process a number of elements of the first vector, and the number of elements processed corresponds to the first number of ALUs

560
Provide, to the program executing on the first core of the processor, the number of elements of the first vector processed by the first vector operations, wherein the number of elements of the first vector processed by the first vector operations is less than the first vector length

FIG. 5

DYNAMIC ALLOCATION OF ARITHMETIC LOGIC UNITS FOR VECTORIZED OPERATIONS

TECHNICAL FIELD

The present disclosure is generally related to vector processing multiprocessor computer architectures, and more particularly, to dynamic allocation of arithmetic logic units (ALUs) for vectorized operations.

BACKGROUND

Vectorized programs perform numeric operations on large amounts of data at relatively high rates of processing. Vectors represent data as sequences of elements, e.g., sequences of 8, 16, 32, or more numeric values. A vector processor can perform operations on the elements of a vector in parallel. Vector processors perform arithmetic operations, such as adding, subtracting, and logic operations, using arithmetic logic units (ALUs). ALUs are ordinarily implemented using digital circuits, e.g., on an integrated circuit (IC). Vector processors have multiple ALUs that process the elements of a vector in parallel. A vector instruction can, for example, add two vectors together to produce an output vector in an amount of elapsed time similar to that used by a non-vector processor to add two scalar (e.g., non-vector) values.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 5 depicts a flow diagram of an example method for executing vector instructions from multiple processor cores in parallel on a vector arithmetic logic unit (VALU) for a portion of elements of an input vector, in accordance with one or more aspects of the present disclosure;

DETAILED DESCRIPTION

Figure 1:
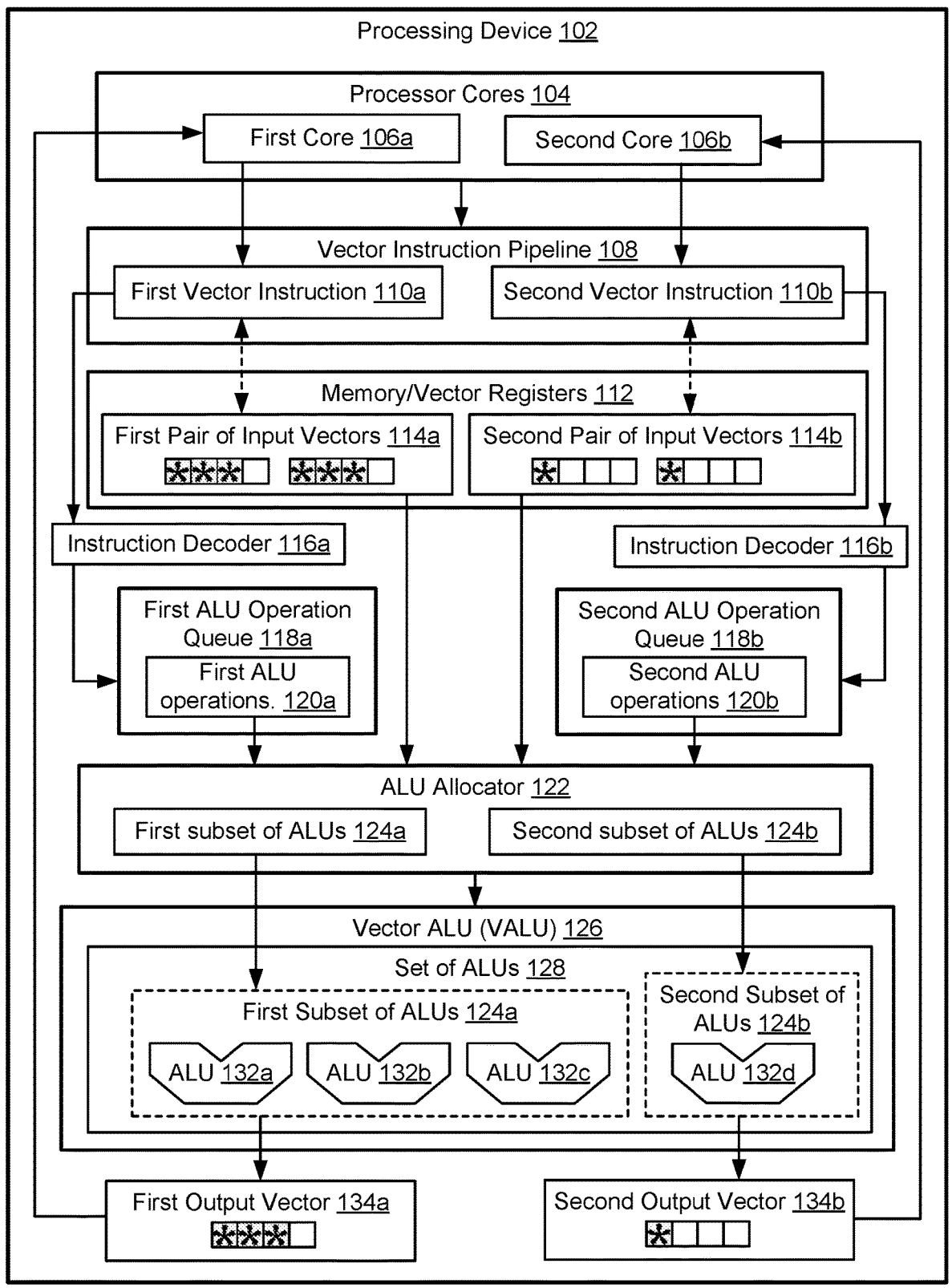
FIG. 1 depicts a high-level block diagram of an example processing device having vector arithmetic logic unit (ALU) that can perform vector operations for two or more processor cores in parallel, in accordance with one or more aspects of the present disclosure.

Described herein are systems and methods for sharing a vector arithmetic logic unit (VALU) among multiple processor cores of a processing device. Vector processors can be used to accelerate computations in applications such as computer graphics, machine learning, and simulation of complex systems. In existing multi-core vector processors, each of the processor cores can have an associated vector arithmetic logic unit ("VALU"). Each core may be, for example, a scalar processor that can send vector instructions to a vector ALU. A vector ALU includes multiple individual arithmetic logic units ("ALUs"), each of which can perform one or more different arithmetic and/or logical operations on a particular element of one or more operand vectors at a particular time. A vector ALU may contain, for example 8, 16, 32, or more individual ALUs. Thus, a vector ALU uses a substantial number of transistors, space, power, and other resources on an integrated circuit (IC). If each core has its own dedicated vector ALU, the transistors, space, power, and other resources on the IC can be duplicated for each vector ALU. However, over time, the utilization of the vector ALU of each core is likely to be low, especially with wide vectors. Thus, the transistors and other resources dedicated to each vector ALU are likely to be underutilized. Code optimizations can be used to increase the utilization of each vector ALU to an extent, but such optimizations may not be possible, depending on the application, and are time-intensive to create. A vector ALU can be shared among multiple cores by enabling each core to access the vector ALU exclusively at a different time. However, such exclusive sharing techniques can be inefficient when the vector ALU is used for substantial periods of time by multiple cores. In such scenarios, the performance of vector operations can be reduced substantially, e.g., by 50%, because other cores wait while one core is using the vector ALU.

Aspects of the present disclosure address the above-noted and other deficiencies by providing technology that enables individual ALUs of a vector ALU (VALU) to be assigned to different processor cores at each time step. Thus, a vector ALU can be shared among multiple different processor cores, instead of providing a separate vector ALU to each processor core, and multiple processor cores can use the vector ALU in parallel. A first vector operation can be performed for a first core on a first ALU of the VALU in parallel with a second vector operation on a second ALU of the VALU for a second core. Vector computations can be performed in a series of time steps, and each time step can correspond to an iteration of a loop in an application program. Each iteration of the loop can request a vector operation to be performed on one or more vectors. The application can specify the number of vector elements to be processed, which is referred to herein as the vector length. The application can then invoke a vector operation, such as a vector add operation, by executing a vector instruction, such as a vector add instruction. The VALU performs the vector operation on the number of elements of one or more vectors specified by the application, where the number of elements is specified as a vector length. Each element in the vector can be processed by one of the ALUs of the VALU.

The vector processor allocates ALUs for each operation. For example, when the application specifies the vector length, the vector processor can determine whether a sufficient number of ALUs are available to perform the vector operation of the specified length.

If a sufficient number of ALUs is not available, e.g., because some ALUs are being used by other cores, and the number of available cores is less than the specified vector length, then the vector processor can provide an indication to the application program of the available vector length which is less than the application-specified vector length. The application can then invoke the vector operation for the available vector length. The available vector length can correspond, for example, to the number of available ALUs. The vector processor can perform the operation using the allocated ALUs, e.g., in a time step. The application can then perform another loop iteration with a new vector length reduced by the available vector length that was provided by the vector processor (e.g., by determining a new specified vector length by subtracting the available vector length from the originally specified vector length). The application can continue performing loop iterations, each of which may correspond to a time step for which the vector processor allocates ALUs to the application, until all elements of the application's vector(s) have been processed. For example, the application loop may end after an iteration for which the available vector length equals the specified vector length, since that iteration processes all of the elements in the application's vector(s). In this way, a vector ALU can be shared among multiple programs executing on multiple cores. The vector processor can enable multiple cores to chare the vector ALU by allocating a subset of the ALUs requested by a first program to the first program on a first core, and allocating another subset of the ALUs to a second program. Multiple programs can thus use the vector ALU in parallel with substantially less overall latency than using the vector ALU sequentially. A vector ALU can be shared by multiple programs on multiple corresponding processor cores, and the processor cores can use ALUs of the vector ALU in parallel. Thus, the resources used for ALUs such as transistors and space on an integrated circuit, as well as power, are substantially reduced in comparison to techniques that provide a separate vector ALU for each processor core. Each program can adjust its operation by performing additional loop iterations to invoke a vector instruction repeatedly when fewer than the specified number of vector elements are processed by an invocation of the vector instruction.

The vector processor can determine the subset of ALUs to allocate to each processor core according to allocation criteria, such as a Quality of Service (QoS) associated with each program or with each core. The QoS may correspond to, for example, a priority, so that vector operations having higher QoS are allocated ALUs sooner (e.g., in earlier time steps) than vector operations having lower QoS (which can be deferred to subsequent time steps). A time step may be, for example, a clock cycle of the vector processor or of the ALU. The allocation criteria can also include a time factor, so that vector operations that were requested earlier (e.g., in an earlier time step) than other vector operations can be given an increased priority or otherwise allocated ALUs prior to other vector operations that may have been requested more recently or have a higher QoS.

Various aspects of the above referenced methods and systems are described in details herein below by way of examples, rather than by way of limitation.

FIG. 1 depicts a high-level block diagram of an example processing device 102 having vector arithmetic logic unit (ALU) 126 that can perform vector operations 120 for two or more processor cores 104 in parallel, in accordance with one or more aspects of the present disclosure. Although the vector ALU 126 is shown as being separate from the processor cores 104, the vector ALU can be included in at least one of the processor cores 104. If the vector ALU 126 is separate from the processor cores 104, then the processor cores 104 may be referred to as scalar processors. The processing device 102 may correspond to the processing device of FIG. 6 or the processing device 702 of FIG. 7 and may be, for example, an integrated circuit that performs the operations described herein. The processing device 102 may be implemented as any suitable type of integrated circuit, which may include an Application-Specific Integrated Circuit (ASIC), a Field-Programmable Gate Array (FPGA), and so on. The processing device 102 may implement a vector processor that uses a vector ALU 126 and may also implement one or more processor cores 104. The processor cores 104 include a first core 106a and a second core 106b. The cores execute instructions and can send vector instructions to a vector instruction pipeline 108. The vector pipeline 108 can sequence the vector instructions 110 and send the vector instructions 110 to other functional units of the processing device 102 to perform operations specified by the vector instructions 110. The vector pipeline 108 can send vector instructions 110 to a functional unit such as the vector ALU 126 to perform arithmetic instructions such as adding, subtracting, and logical operations. The vector pipeline 108 can send the vector instructions 110 to the vector ALU 126 via ALU operation queues 118, which can store the vector instructions 110 until the vector ALU 126 is ready to execute them. Alternatively or additionally, the vector instructions 110 can be sent to the vector ALU in other ways, e.g., without using the ALU operation queues 118.

Each vector instruction 110 may specify one or more input vectors 114 as operands, which may be stored in the memory or in vector registers 112. The first vector instruction 110a specifies a first pair of input vectors 114a, and the second vector instruction 110b specifies a second pair of input vectors 114b. In the example of FIG. 1, each vector stored in the memory or vector registers 112 can store up to 4 elements. The first pair of input vectors 114a, for example, may include a first input vector and a second input vector for a vector operation specified by a first vector instruction 110a. The first and second input vectors of the first pair of input vectors 114a, for example, may be, e.g., two vectors to be added by a vector add instruction. For vector instructions that have a single vector parameter, one of the first pair of input vectors 114a may be unused or not present. Each of the first pair of input vectors 114a contains three elements (shown as asterisks) and thus has a vector length of 3. The second pair of input vectors 114b similarly includes first and second input vectors. Each of the second pair of input vectors 114b contains one element (shown as an asterisk) and thus has a vector length of 1.

A first vector instruction 110a can be sent from the vector instruction pipeline 108 to an instruction decoder 116a, which can cause one or more vector ALU operations to be generated according to an operation code specified in the first vector instruction 110a. The vector ALU operations can be a form of instructions that specify particular operations that the vector ALU 126 can perform, e.g., adding, subtracting, logic operations, and so on. The vector operations generated or identified by the instruction decoder 116a can be sent to a first ALU operation queue 118a, which can store the vector operations as first ALU operations 120a until the ALU operations are removed (e.g., de-queued) from the first ALU operation queue 118a. An ALU allocator 122 may de-queue one or more of the first ALU operations 120a and identify a first subset of ALUs 124a for the de-queued ALU operations. The first subset of ALUs 124a can be the ALUs for performing one or more of the first ALU operations 120a. The first subset of ALUs 124a can reference particular ALUs 126, e.g., ALUs 132a, 132b, 132c in the set of ALUs 132. Alternatively, the first subset of ALUs 124a can represent how many of the ALUs 132 are to be allocated to processing one or more of the first ALU operations 120a, and the particular ALUs in the first subset 130a can be selected according to other factors or at random. Note that the terms "first subset" 124a and "second subset" 124b are used herein for explanatory purposes to refer to the ALUs 132 allocated to processing the first ALU operations 120a and the second ALU operations 129b, respectively. The first and second subsets 124a, 124b are ordinarily disjoint (e.g., each ALU is in either the first subset 124a or the second subset 124b), since a particular ALU 132 is not ordinarily shared between different vector instructions 110a, 110b from different respective cores 106a, 106b.

Similarly to the first vector instruction 110 described above, a second vector instruction 110b can be sent from the vector instruction pipeline 108 to an instruction decoder 116b, which can cause one or more vector ALU operations to be generated according to an operation code specified in the first vector instruction 110b. The vector operations generated or identified by the instruction decoder 116b can be sent to a second ALU operation queue 118b, which can store the vector operations as second ALU operations 120b until the ALU operations are removed (e.g., de-queued) from the second ALU operation queue 118b. The ALU allocator 122 may de-queue one or more of the second ALU operations 120b and identify a second subset of ALUs 124b for the de-queued ALU operations. The second subset of ALUs 124b can be the ALUs for performing one or more of the second ALU operations 120b. The second subset of ALUs 124b can reference particular ALUs 126, e.g., ALU 132d in the set of ALUs 128. Alternatively, the second subset of ALUs 124a can represent how many of the ALUs 132 are to be allocated to processing one or more of the second ALU operations 120b, and the particular ALUs in the second subset 130b can be selected according to other factors or at random.

The ALU allocator 122 may identify the first and second subsets of ALUs 124 according to allocation criteria, such as a Quality of Service (e.g., a priority or a time-related factor) and also according to a first vector length of a first input vector in the first pair of input vectors 114a and a second vector length of a second input vector in the second pair of input vectors 114b. Both the first and second vector lengths may be factors in determining the number of ALUs 132 to allocate to each of the subsets 124 that correspond to each of the first ALU operations 120a because the ALUs 132 are divided among the first ALU operations 120a and the second ALU operations 120b.

A Quality of Service (QoS) may be assigned to or associated with each ALU operation 120. Each ALU operation 120 may correspond to an element of an input vector 114. A QoS may be a numeric value that corresponds to a QoS level and can be compared to other QoS levels according to an ordering of QoS levels. For example, a QoS may be 1, 2, or 3, where QoS 1 is greater than QoS 2 and QoS 2 is greater than QoS 3. Although a particular number of priorities having particular values is described in this example, there may be any suitable number of priorities having any suitable values. The QoS of each ALU operation may be determined by a QoS of the vector instruction 110. For example, the QoS of each ALU operation 120 may be the same as the QoS of the corresponding vector instruction 110. The QoS of each vector instruction 110 may be determined by a QoS of the thread or process executing the instruction 110, by a QoS of the program executing the instruction, by the QoS of a core 106 executing the instruction 110, a combination of one or more of those, or other source of QoS designation. A Quality of Service may be another type of value, e.g., a maximum acceptable ALU operation latency, a maximum acceptable instruction execution latency, a priority value, and so on.

The instruction decoder 116a, or other component that translates the first vector instruction 110a to ALU operations 120a, can identify one or more ALU operations 120a that correspond to (e.g., implement) the instruction 110a. The identified ALU operations 120a are referred to herein as "requested ALU operations 120a." The ALU allocator 122 can then determine whether the total number of requested ALU operations 120a at a particular clock cycle is less than or equal to the total number of ALUs 132 in the vector ALU 126. Alternatively, since the number of requested ALU operations 120 corresponds to a vector length of each input vector 114, the ALU allocator 122 can determine whether a sum of a first vector length of one of the first pair of input vectors 114a specified by a first vector instruction 110a received from a first processor core 106a and a second vector length of one of the second pair of input vectors 114b specified by a second vector instruction 110b received from a second processor core 106b is less than or equal to the total number of ALUs 132 of the vector ALU 126 at a particular clock cycle.

In particular embodiments, if the ALU allocator 122 determines that the sum is less than or equal to the total number of ALUs 132, then the ALU allocator 122 can set the number of ALUs in the first subset 124a (e.g., set the size of the first subset) to the corresponding first vector length, and set the number of ALUs in the second subset 124b (e.g., set the size of the second subset) to the corresponding second vector length. Ordinarily, in a particular clock cycle, one operation 120 is requested for each element in an input vector 114.

As an example, in FIG. 1, at a particular clock cycle, there are three requested ALU operations 120a, which correspond to the three asterisks in the first pair of input vectors 114a, and one requested ALU operation 120b, which corresponds to the single asterisk in the second pair of input vectors 114b. Since there are four ALUs 132 in the example of FIG. 1, these four operations 120 can be executed in the same clock cycle. A first output vector 134a having three elements and a second output vector 134b having one element can be generated by the ALUs 132 that perform the operations 120. In one example, the first and second output vectors 134 can be generated in the same clock cycle, which can be the clock cycle in which the operations 120 are performed by the ALUs 132.

Thus, in the example of FIG. 1, since the total vector length (four), which corresponds to the total number of requested operations 120 (four) is less than or equal to the total number of ALUs 132 in the vector ALU 126 (four), the requested operations 120 (three operations 120a and one operation 120b) can be performed in the same clock cycle. The ALU allocator 122 allocates an ALU 132 to each of the requested operations 120, and each subset of ALUs 124 corresponds to one of the vector instructions 110, which corresponds to one of the cores 106b. The ALU allocator 122 determines that the number of ALUs 132 in the first subset of ALUs 124a is three because the input vector 114a's length is three elements. Thus, there are ALU operations 120a to which ALUs are allocated in the particular clock cycle. The particular clock cycle may be, for example, the clock cycle in which the vector instruction 110a that specifies the first ALU operations 120a is executed.

Similarly, the ALU allocator 122 determines that the number of ALUs 132 in the second subset of ALUs 124b is one because the input vector 114b's length is one element. Thus, there is one ALU operation 120b to which an ALU is allocated in a particular clock cycle. The particular clock cycle may be, for example, the clock cycle in which the vector instruction 110b that specifies the second ALU operation 120b is executed. The clock cycle in which the vector instruction 110b is executed can be the same clock cycle in which the vector instruction 110a is executed in the example of FIG. 1. Thus, the processing device can perform instructions 110a and 110b, from two processor cores 106a, 106b, in parallel on the vector ALU 126.

The ALU allocator 120 may determine that the total number of ALUs 132 of the vector ALU 126 is insufficient to execute all of the requested operations 120. In particular embodiments, if the ALU allocator 122 determines that the total number of requested ALU operations 120a, 120b at a particular clock cycle is greater than the total number of ALUs, then the ALU allocator 122 can set the number of ALUs in the first subset to a value less than the first vector length and, alternatively or additionally, set the number of ALUs in the second subset to a value less than the second vector length. The particular values less than the first and/or second vector lengths can be determined by a QoS resource allocation model using QoS values associated with the corresponding first and/or second vector lengths. The size of the first/and or second subset is reduced because the total number of ALUs 132 of the vector ALU 126 is insufficient to execute all of the requested operations 120. Accordingly, the number of ALUs in at least one set 124 is less than the number of operations 120 requested for the corresponding instruction 110, and at least one of the operations 120 is deferred to a subsequent clock cycle. Operations 120 that are deferred in a particular clock cycle can remain in the corresponding ALU operation queue 118 without being executed in the particular clock cycle. Each deferred operation can be allocated to an ALU 132 by the ALU allocator 122 in a subsequent clock cycle. Operations 120 to which an ALU 132 is allocated in a particular clock cycle can be removed from the corresponding ALU operation queue 118 and are executed in the particular clock cycle.

If the total number of ALUs 132 of the vector ALU 126 is insufficient to execute all of the requested operations 120, then the number of operations performed by the set of ALUs 128 is reduced to an "allocated number" of operations for which there are a sufficient number of ALUs 132. The ALU allocator 122 can determine the allocated number of operations by subtracting the total number of available ALUs 132 from the number of requested operations 120. The ALU allocator 122 can then allocate an ALU 132 to each of the allocated number of operations, and the remaining operations can be deferred to a subsequent clock cycle. In particular embodiments, the ALU allocator 122 can select the allocated number of operations from the operation queues 118 and remove the selected operations from the queues 118. The particular operations 120 selected can be chosen arbitrarily by the ALU allocator 122, e.g., by any subset of the operations 120. The particular operations 120 can be allocated ALUs by the ALU allocator. One or more of the subsets of ALUs 124 may have fewer ALUs 132 than are needed to perform all the operations 120 requested for the corresponding vector instruction 110. In the next clock cycle, the ALU allocator 122 can give deferred operations 120 higher QoS than "new" operations 120 received in the next clock cycle. Accordingly, in the next clock cycle, ALUs 132 can be allocated to the deferred operations up to the total number of ALUs 132. If there are insufficient ALUs for the deferred or new operations in the next clock cycle, then operations for which there are insufficient ALUs can be deferred until another subsequent clock cycle. In each subsequent clock cycle, if operations have been deferred from multiple earlier clock cycles, then the operations from earlier clock cycles are given QoS over operations from more recent clock cycles. Eventually, e.g., after the number of instructions received in one or more clock cycles is less than the total number of ALUs 132, all of the deferred operations can be executed. If ALU operations are deferred until a subsequent clock cycle, then the program that invoked the corresponding vector instruction 110 can be informed that fewer than the requested number of operations were performed. For example, a count of the number of operations actually performed, referred to above as the number of allocated operations, may be provided to the program.

In particular embodiments, the ALU allocator 122 can use "allocation criteria" to determine which of the operations 120 are to be allocated ALUs 132. The allocation criteria may include a quality of service, which can be, e.g., a QoS value, associated with each ALU operation 120 (which may be the QoS of the instruction 110, for example). The ALU allocator 122 can give deferred operations 120 higher priority than "new" operations, so that an operation 120 that has been deferred from a previous clock cycle can be executed prior to an operation 120 from a current clock cycle, even if the operation 120 from the current clock cycle has a higher QoS than the deferred operation. As an example, there may be a "high" QoS (e.g., QoS value of 1), a "medium" QoS (e.g., QoS value of 2), and a "low" QoS (QoS value of 3). Operations having the high QoS may be executed prior to operations deferred from pervious clock cycles. That is, for example, an operation having the high QoS may be allocated to an ALU when there is a choice between allocating an operation having the high QoS and an operation having a lower QoS or an operation deferred from a previous clock cycle. Deferred operations may be given a medium QoS, unless their QoS is already greater than medium. That is, deferred operations may be given a QoS that is the greater of their existing QoS or the medium QoS. For example, if there is a choice to be made between an operation having a medium QoS and a deferred operation, the choice may be made arbitrarily or based on other criteria, such as the number of operations previously executed for the medium QoS and the number of deferred operations previously executed. In the latter case, the operation having the medium QoS may be chosen when fewer medium QoS operations have been executed than deferred operations, and vice versa. As another example, if more than one ALU is available for allocation, medium QoS operations may be allocated the same number of ALUs as deferred operations.

If there are more requested operations 120 than the total number of ALUs 132 in the set of ALUs 128 at a particular clock cycle, then the allocation of ALUs 132 to operations 110 may be determined according to the QoS of each operation 120 using a resource allocation model. Any suitable resource allocation model or technique may be used, e.g. the QoS-based Resource Allocation Model (Q-RAM) or the like. For example, if at least one of the operations 120a has a different QoS than at least another one of the operations 120b, then the number of ALUs in each subset 124 may be determined according to the QoS of each operation 120 and the total number of ALUs in the set of ALUs. The total number of ALUs in the set of ALUs constrains the sizes of the subsets 124. As discussed above, the ALU allocator 122 can identify the second subset of ALUs 124b according to allocation criteria, such as a quality of service associated with the second ALU operations 120b. Thus, since the set of ALUs 128 can be partitioned between the first and second ALU operations 120a, and the number of ALUs in the first subset 124a is related to the number of ALUs in the second subset 124b (e.g., the sum of the number of ALUs in the first subset 124a and the number of ALUs in the second subset 124b should be equal to, or less than or equal to, the total number of ALUs 128 in the vector ALU 126.

The vector ALU 126 may execute the operations from the first and second ALU operation queues, e.g., by sending the operations to their respective allocated ALUs 132. The ALUs 132 may perform the operations and generate output such as scalar or vector values. The output may be sent to the processor cores 104. In the example of FIG. 1, the first subset of ALUs 124a, which includes three ALUs 132a, 132b, 132c, performs a vector operation specified by a first ALU operation 120a (e.g., addition) on the first pair of input vectors 114a. Each input vector 114a contains three elements, and each of the three ALUs 132a, 132b, 132c in the first subset of ALUs 124a performs the vector operation (e.g., addition) on the corresponding elements of the input vectors 114a and generates a corresponding element of the first output vector 134a (e.g., the sum of the corresponding elements of the first pair of input vectors 114a). An application program executing on the first core 106a can receive the first output vector 134a as an output of the first vector instruction 110a.

Further, in the example of FIG. 1, the second subset of ALUs, which includes one ALU 132d, performs a vector operation specified by a second ALU operation 120b (e.g., subtraction) on the second pair of input vectors 114b. Each input vector 114b contains one element, and the ALU 132d performs the vector operation (e.g., subtraction) on the second pair of input vectors 114b and generates the element of the second output vector 134b (e.g., the difference between the corresponding elements of the first pair of input vectors 114b). The second output vector 134b is sent to the second core 106b. An application program executing on the second core 106b can receive the second output vector 134b as an output of the second vector instruction 110b.

Figure 2:
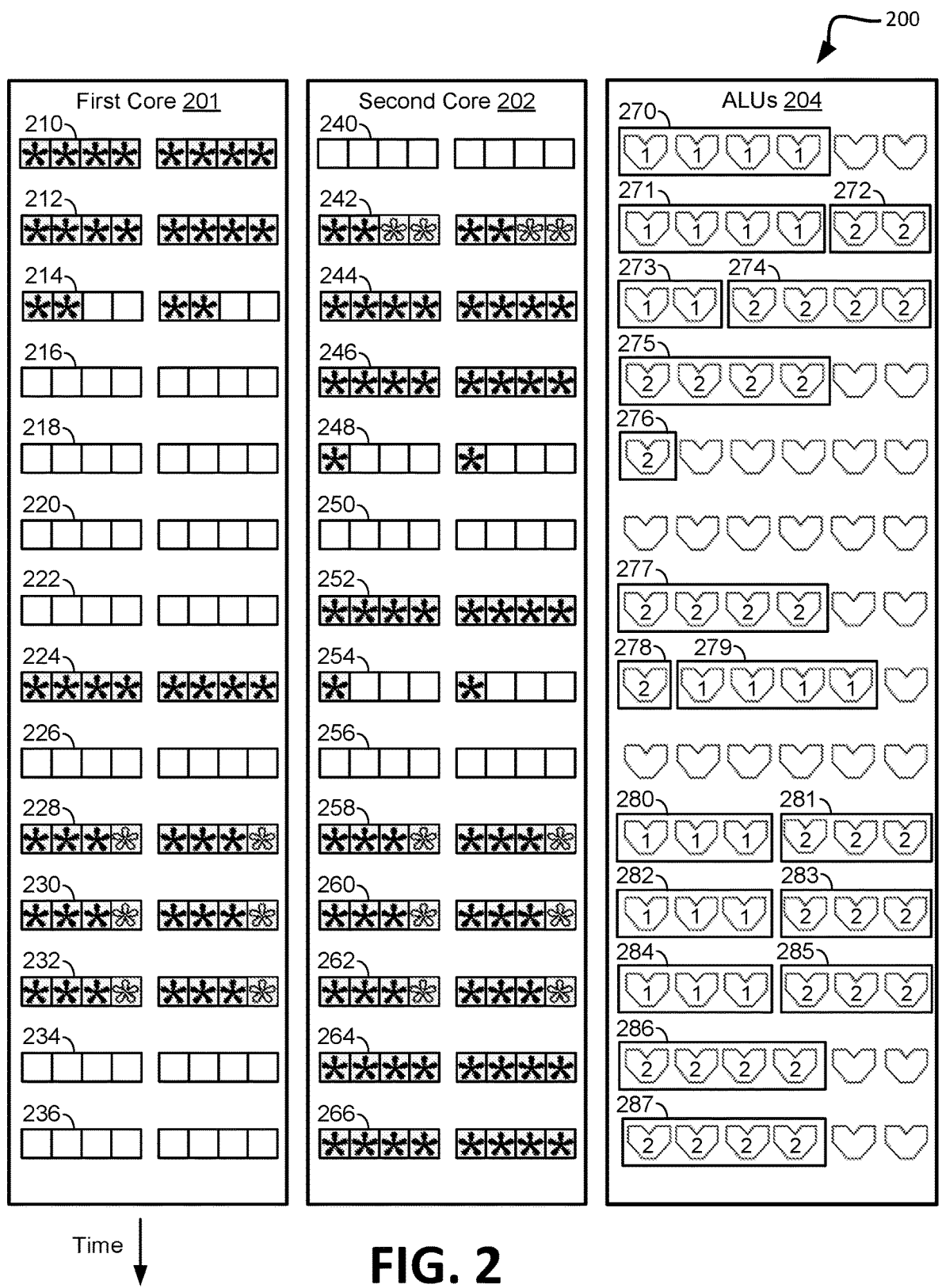
FIG. 2 depicts an example of parallel execution of vector operations from two processor cores in parallel by a vector ALU, in accordance with one or more aspects of the present disclosure.

FIG. 2 depicts an example of parallel execution 200 of vector operations from two processor cores in parallel by a vector ALU, in accordance with one or more aspects of the present disclosure. The example execution 200 includes first and second input vectors of a first core 201, which are shown in a first column, and first and second input vectors of a second core 202, which are shown in a second column. Each input vector can have up to four elements. The first and second input vectors have the same numbers of elements in this example. Each row corresponds to a time step (e.g., a clock cycle or other unit of instruction execution), with time increasing in the downward direction. The first row, for example, corresponds to a time step referred to herein as TS=1. The time step of a row can correspond to a time (or clock cycle) at which an application program invoked an instruction that specified the vector operations being performed in the row. Thus, each time step may correspond to an invocation of a vector instruction by an application program. Each time step may correspond to a loop iteration of an application program if the application program invokes a vector instruction in a loop.

In the first row of execution 200, which occurs at TS=1, a first vector 210 from the first core 201 has four elements, as shown by four solid asterisks. Solid asterisks indicate that the vector element is executed in the time step of the row. Outlines of asterisks ("hollow" asterisks) represent elements that are not executed in the time step of the row. The term "asterisk" herein refers to a solid asterisk, and the term "hollow asterisk" refers to an asterisk outline.

A table labeled ALUs 204 illustrates the allocation of ALUs to first and second subsets for each row of the execution 200. In this example, a vector ALU has six individual ALUs, which are shown in each row. Each ALU can be allocated to one of: the first core (and the first subset), as shown by a number "1" in the ALU, the second core (which corresponds to the second subset), as shown by a number "2" in the ALU, or unallocated, in which case there is no number in the ALU.

The first subset of ALUs, which is allocated to an operation received from the first core 201, is shown as a rectangle around one or more of the individual ALUs 204. If the first subset is empty in a particular row, then no rectangle is shown for the first subset in that row. Similarly, the second subset of ALUs, which is allocated to an operation received from the second core 202, is shown as a rectangle around one or more of the individual ALUs 204. If the second subset is empty in a particular row, then no rectangle is shown for the second subset in that row. In the first row, which occurs at TS=1, the first subset contains 270 contains four ALUs. Thus, the four ALUs are allocated to performing operations for an instruction received from the first core 201. There are four elements in each input vector 210 of the first core 201, and no elements in each input vector 240 of the second core 202. As shown by first subset 270, at TS=1, four of the six ALUs are allocated to the first core, and, since there are no elements in the vector 240 from the second core, the remaining two ALUs are not allocated.

At TS=2, input vector 212 from the first core 201 contains 4 elements, and input vector 242 from the second core 242 also contains 4 elements. The total number of operations to be performed is thus 8. Since there are only 6 ALUs, two of the operations are not performed at time step TS=2. Four ALUs are allocated to the first subset 271, so all four of the first core's elements are processed at TS=2, as shown by four solid asterisks in the vector 212. However, only two of the second core's elements are allocated to ALUs and processed, as shown by two solid asterisks in the vector 242. The two ALUs allocated to the two elements are allocated are shown in subset 272. The other two elements of the vector 242, which are not allocated to ALUs at TS=2, are shown as hollow asterisks. The unallocated elements can be allocated in a subsequent time step. For example, the unallocated elements can remain in the second ALU operation queue 118b as second ALU operations 120b) until dequeued by the ALU allocator 112 in a subsequent time step. The two unallocated elements from vector 242 can allocated to ALUs at a subsequent time step, e.g., to subset 274 at TS=4 or subset 275 at TS=5 (if not allocated at TS=4), as described below.

Deferral of allocation of elements from the second core may occur if operations from the first core have a higher QoS than operations from the second core. For example, a program or thread that invoked the operations on the first core has a higher QoS than the program or thread that invoked the operations on the second core, or because the first core has a higher QoS than the second core). Thus, in this example, at TS=2, two of the elements from the second core have been deferred to a subsequent time step. In other examples, if operations from the first core have the same QoS as operations from the second core, then a tie-breaker formula or criteria can be used to select which of the cores obtains the allocation. For example, the cores may have associated numbers, and the core having the lower number may be selected for the allocation in case of ties. As another example, the core having the fewest allocated operations may be selected for the allocation in case of ties.

At TS=3, input vector 214 from the first core 201 contains 2 elements, and input vector 244 from the second core 202 contains four elements. The total number of operations to be performed is thus 6, and each element can be allocated to an ALU. The two elements of vector 214 from the first core 201 are allocated to two ALUs in subset 273. Four elements from the second core 202 are allocated to four ALUs in subset 274. Since the four asterisks in vector 244 are solid, this indicates none of the elements of vector 244 are deferred to a time step subsequent to TS=3. Accordingly, the two elements deferred from vector 242 of TS=1 are shown as solid asterisks and are allocated to two ALUs of a subset 274. Further, two new elements have been received from the second core 202 at TS=3, and are allocated to two ALUs in the subset 274.

At TS=4, input vector 216 from the first core has no elements, e.g., because there is no program executing on the first core, or because the program executing on the first core has not invoked a vector instruction at TS=4. Input vector 246 from the second core has four elements, which are allocated to a subset 275. At TS=5, input vector 218 from the first core has no elements, and input vector 248 from the second core has one element. The element of input vector 248 is allocated to a subset 276 that contains one ALU. At TS=6, input vector 220 from the first core has no elements, and input vector 250 form the second core also has no elements. Thus, no ALUs are allocated, and no allocated subsets are shown in the ALU 204.

At TS=7, input vector 222 from the first core has no elements, and input vector 252 from the second core has four elements. Thus, no ALUs are allocated for the first core, and four ALUs are allocated to subset 277 for the second core. At TS=8, input vector 224 from the first core contains four elements, and input vector 254 from the second core contains 1 element. Accordingly, a four-ALU subset 279 is assigned to the first core, and a one-ALU subset 278 is assigned to the second core. At TS=9, input vector 226 and input vector 256 are both empty, and no ALUs are allocated.

At TS=10, input vector 228 from the first core contains four elements, and input vector 258 from the second core also contains four elements. Since the total number of elements (8) is greater than the number of available ALUs by 2, it follows that 2 of the 8 elements received at TS=10 are deferred to a subsequent time step. In this example, one element from each core has been deferred, as shown by one hollow asterisk in vector 228 of the first core and one hollow asterisk in vector 258 of the second core. An equal number of elements has been deferred from each core, as may occur if fair allocation criteria are used. Three elements from vector 228 are allocated to a three-ALU subset 280, and three elements from vector 258 are allocated to a three-ALU subset 281. Thus, six operations are performed at TS=10, and two operations are deferred to a subsequent time step.

At TS=11, input vector 230 from the first core contains four elements, and input vector 260 from the second core also contains four elements. Similarly to TS=10, one element of each input vector 230 has been deferred from the previous step. As in time step TS=10, three elements from the first core and three elements from the second core are processed. The two deferred elements from the previous step are processed at TS=11, and two elements that are received at TS=11 are deferred to a subsequent time step, as shown by the two hollow asterisks. Thus, three ALUs in a subset 282 are allocated to elements first core, and three ALUs in a subset 283 are allocated to elements from the second core.

At TS=12, input vector 232 from the first core contains four elements, and input vector 262 from the second core also contains four elements. Similarly to TS=10 and TS=11, one element of each input vector 232 has been deferred from the previous step. As in time step TS=11, three elements from the first core and three elements from the second core are processed. The two deferred elements from the previous step are processed at TS=12, and two elements that are received at TS=12 are deferred to a subsequent time step, as shown by the two hollow asterisks. Thus, three ALUs in a subset 284 are allocated to elements first core, and three ALUs in a subset 285 are allocated to elements from the second core.

At TS=13, input vector 234 from the first core is empty, and input vector 264 from the second core contains four elements. The four elements are allocated to four ALUs in a subset 286. Similarly, at TS=14, input vector 236 from the first core is empty, and input vector 266 from the second core contains four elements. The four elements are allocated to four ALUs in a subset 287.

Figure 3:
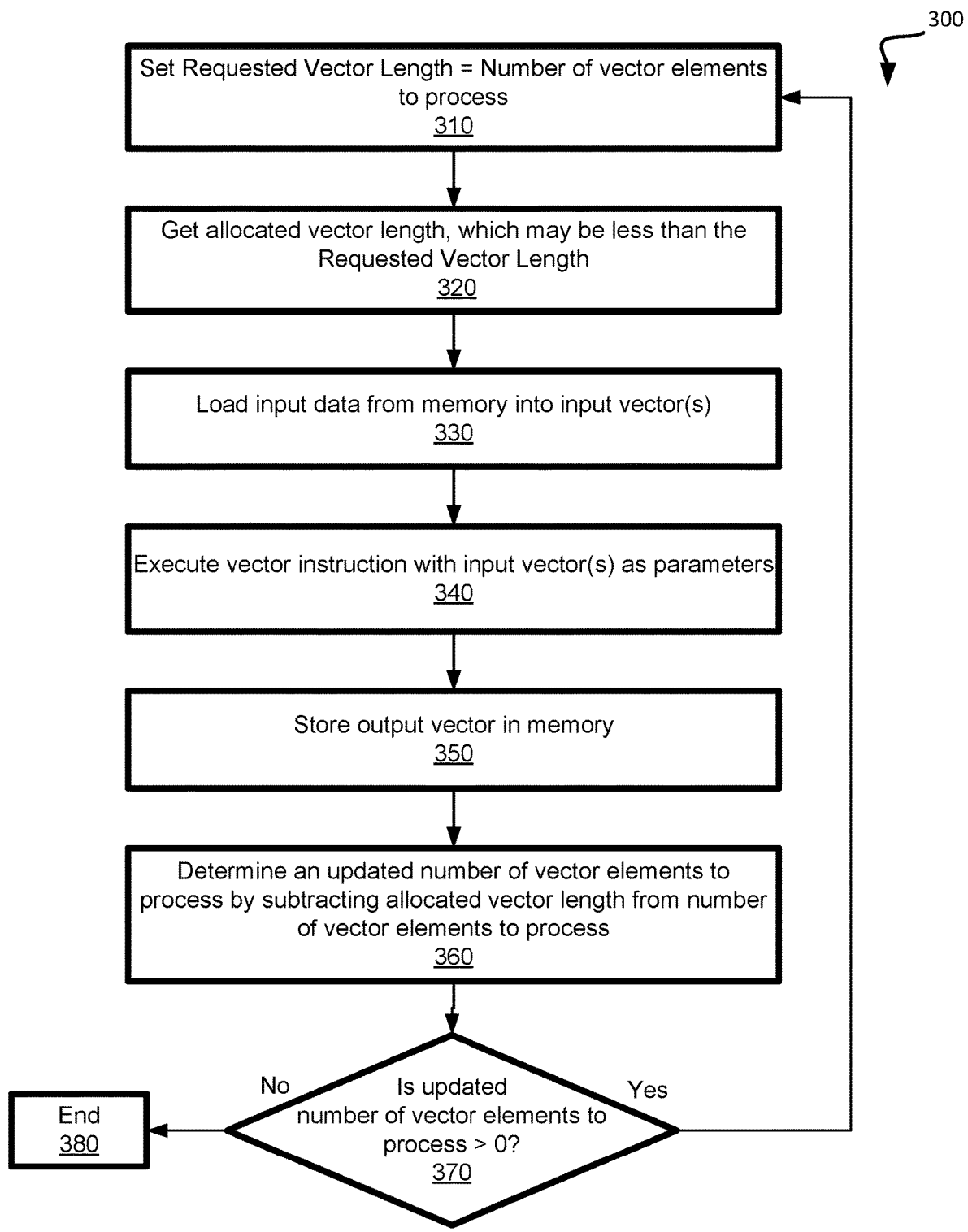
FIG. 3 depicts a flow diagram of an example method for performing vector computations in an application program, in accordance with one or more aspects of the present disclosure.

FIG. 3 depicts a flow diagram of an example method 300 for performing vector computations in an application program, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by processing device 102 of FIG. 1 or by an executable code of a host machine (e.g., host operating system or firmware), a virtual machine (e.g., guest operating system or virtual firmware), an external device (e.g., a PCI device), other executable code, or a combination thereof.

Method 300 may be performed by processing devices of a server device or a client device and may begin at block 310. Method 300 may correspond to an application program that invokes vector instructions. Vector computations can be performed in a series of time steps, and individual ALUs can be assigned to processor cores at each time step. For example, each time step can correspond to one or more iterations of a loop in an application program. Each iteration of the loop can execute one or more vector instructions. Each vector instruction can specify one or more vector operations to be performed, and each operation can be performed on one or more input vectors. The application can specify a requested vector length, which can correspond to a number of vector elements to be processed. The requested vector length can be specified by an initial "set vector length" instruction, which does not perform vector operations. The "set vector length" instruction can cause the vector ALU to allocate a number of individual ALUs to the processor core that executed the instruction. If fewer than the requested number of ALUs are available, the "set vector length" instruction can allocate the available number of ALUs to the requesting core and provide to the application program an "allocated" vector length that is based on the number of ALUs allocated. If the requested number of ALUs are available, the "set vector length" instruction can provide an allocated vector length that is the same as the requested vector length. The allocated vector length indicates how many operations will actually be performed by a subsequent vector instruction. The ALUs can remain allocated to the core until they are freed. The ALUs can be freed by the application, e.g., by executing an appropriate instruction, or by the vector processor, e.g., after each time step or after the application program ends. Method 300 illustrates the use of a "set vector length" instruction named "setvl".

As an alternative to the "set vector length" instruction, the application program can instead specify the vector length in association with a vector instructions (e.g., via an operand of a vector add instruction), and the vector instruction can provide to the application program an indication of how many vector elements have been processed (which can correspond to the number of operations performed by the vector instruction). The application program can then execute the vector instructions repeatedly in a loop until all the vector elements in the application's data set have been processed.

At block 310, a processing device may invoke a "set vector length" instruction to set a requested vector length to number of vector elements to process. For example, the application program may include loop instructions that begin by setting a variable N to the number of data elements to be processed. The application program may further call an instruction of a vector processor to specify that the vector length requested to be used for subsequent vector instructions is N. For example, if the application's data contains 64 elements, N may be 64. The instruction may be, e.g., a setvl instruction of the RISC-V vector instruction set. The setvl instruction may return a result that indicates an allocated vector length. The result may be received at block 320.

At block 320, the processing device may get an allocated vector length, which may be less than requested vector length. For example, the allocated vector length may be received as a result value from a setvl instruction. If the vector processor allocates 32 ALUs to the application program, then the allocated vector length may be 32.

At block 330, the processing device may load input data from memory into one or more input vectors, e.g., vectors named A and B. The input vectors may be stored in vector registers, for example. At block 340, the processing device may execute vector instruction with input vector(s) as parameters. For example, to add vectors, the application may execute an add vector instruction with the vectors A and B as input vectors.

At block 350, the processing device may store an output vector in memory. The output vector may be retrieved from a vector register, for example. For example, the output vector may be a vector named C that contains the sum of vectors A and B. At block 360, the processing device may subtract the allocated vector length from number of vector elements to process. For example, the number of vector elements may be 64, the allocated vector length may be 32, and the updated number of vector elements to process may be 32.

At block 360, the processing device may determine whether the updated number of vector elements to process is greater than 0. If so, block 360 may invoke block 310 to perform a second iteration of the loop of blocks 310-370 with the updated number of vector elements to process. If the allocated vector length determined at block 320 of the second iteration is 32, then the remaining 32 elements of the vectors A and B will be processed in the second iteration, and the loop will end after the second iteration. If the allocated vector length is less than 32, e.g., because less than 32 ALUs are available, then a third iteration may be performed, and so on, to reach an iteration in which the allocated vector length provided by the vector processor is equal to the requested vector length, after which block 370 may determine that the updated number of vector elements to process is 0, and invoke block 380, at which the method may terminate. The loop body may use one or more time steps (e.g., vector ALU clock cycles) to execute. Although examples described herein perform an allocation of ALUs for each loop iteration, the ALU allocation can be performed more than once in a loop iteration, different numbers of times in different loop iterations, or not performed in one or more loop iterations. Responsive to completing the operations described herein above with references to block 380, the method may terminate.

Figure 4:
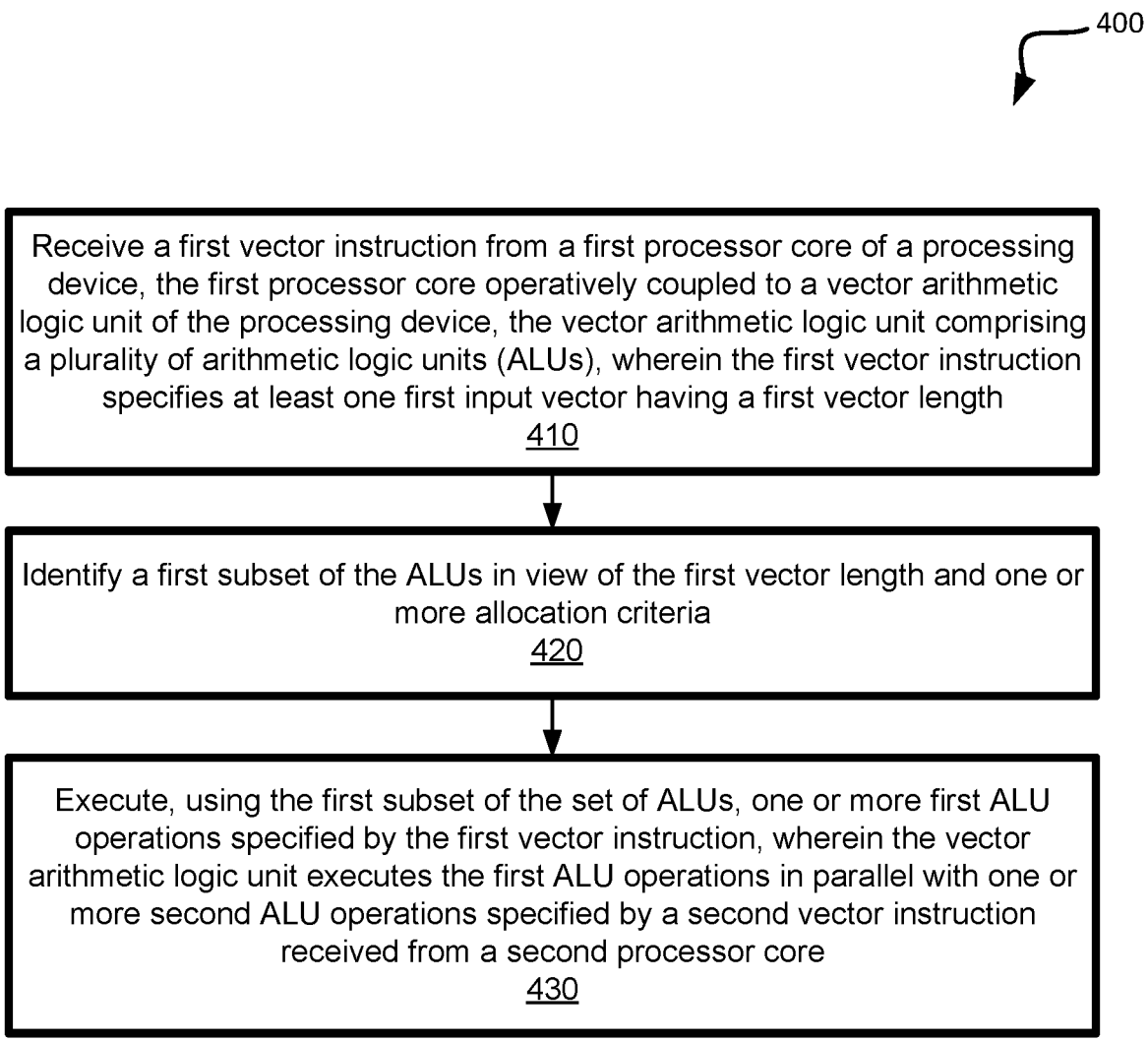
FIG. 4 depicts a flow diagram of an example method for executing vector instructions from multiple processor cores in parallel on a vector arithmetic logic unit (VALU), in accordance with one or more aspects of the present disclosure.

FIG. 4 depicts a flow diagram of an example method for executing vector instructions from multiple processor cores in parallel on a vector arithmetic logic unit (VALU), in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by processing device 102 of FIG. 1 or by an executable code of a host machine (e.g., host operating system or firmware), a virtual machine (e.g., guest operating system or virtual firmware), an external device (e.g., a PCI device), other executable code, or a combination thereof.

Method 400 may be performed by processing devices of a server device or a client device and may begin at block 410. At block 410, a processing device may Receive a first vector instruction from a first processor core of a processing device, the first processor core operatively coupled to a vector arithmetic logic unit of the processing device, the vector arithmetic logic unit comprising a plurality of arithmetic logic units (ALUs), wherein the first vector instruction specifies at least one first input vector having a first vector length. At block 420, the processing device may identify a first subset of the ALUs in view of the first vector length and one or more allocation criteria. At block 430, the processing device may execute, using the first subset of the set of ALUs, one or more first ALU operations specified by the first vector instruction, wherein the vector arithmetic logic unit executes the first ALU operations in parallel with one or more second ALU operations specified by a second vector instruction received from a second processor core. Responsive to completing the operations described herein above with references to block 430, the method may terminate.

FIG. 5 depicts a flow diagram of an example method for executing vector instructions from multiple processor cores in parallel on a vector arithmetic logic unit (VALU) for a portion of elements of an input vector, in accordance with one or more aspects of the present disclosure.

Method 500 and each of its individual functions, routines, subroutines, or operations may be performed by one or more processors of the computer device executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processes implementing method 500 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 500 may be performed by processing device 102 of FIG. 1 or by an executable code of a host machine (e.g., host operating system or firmware), a virtual machine (e.g., guest operating system or virtual firmware), an external device (e.g., a PCI device), other executable code, or a combination thereof.

Method 500 may be performed by processing devices of a server device or a client device and may begin at block 510. At block 510, a processing device may receive a first vector instruction from a program executing on a first core of a processor, the first vector instruction associated with a first vector length that specifies a first number of elements in the first vector. At block 520, the processing device may receive a second vector instruction from a second core of the processor, the second vector instruction associated with a second vector length that specifies a second number of elements in the second vector, wherein the processor comprises a vector logic unit, and the vector logic unit comprises a set of arithmetic logic units (ALUs).

At block 530, the processing device may determine, in view of the first vector length and the second vector length, a first number of ALUs of the vector logic unit, wherein the first number of ALUs corresponds to a first subset of the set of ALUs. At block 540, the processing device may determine, in view of the first vector length and the second vector length, a second number of ALUs of the vector logic unit, wherein the second number of ALUs corresponds to a second subset of the set of ALUs, wherein the first and second subsets are disjoint, and wherein a sum of the first and second numbers of ALUs is less than or equal to a total number of ALUs in the set of ALUs. The size of the first subset (e.g., the number of ALUs in the first subset) can be set to the first number of ALUs, and the size of the second subset (e.g., the number of ALUs in the second subset) can be set to the second number of ALUs.

At block 550, the processing device may perform one or more first vector operations specified by the first vector instruction using the first number of ALUs of the vector logic unit, wherein the first vector operations process a number of elements of the first vector, and the number of elements processed corresponds to the first number of ALUs.

At block 560, the processing device may provide, to the program executing on the first core of the processor, the number of elements of the first vector processed by the first vector operations, wherein the number of elements of the first vector processed by the first vector operations is less than the first vector length. In particular embodiments, the program executing on the first core may then determine an updated vector length that specifies a number of remaining elements to be processed. For example, the program may subtract the number of elements of the first vector processed by the first vector operations from the first vector length, and use the difference as the updated vector length. The program may execute a third instruction associated with the updated vector length to specify the updated vector length, e.g., by invoking a "set vector length" instruction as described above with respect to FIG. 3. The processing device may subsequently receive, from the program executing on the first core of the processor, an instruction that specifies the updated vector length, which corresponds to a third number of elements in the first vector. The third number of elements may correspond to elements of the first vector not processed by the one or more first vector operations specified by the first vector instruction. Responsive to completing the operations described herein above with references to block 560, the method may terminate.

Figure 6:
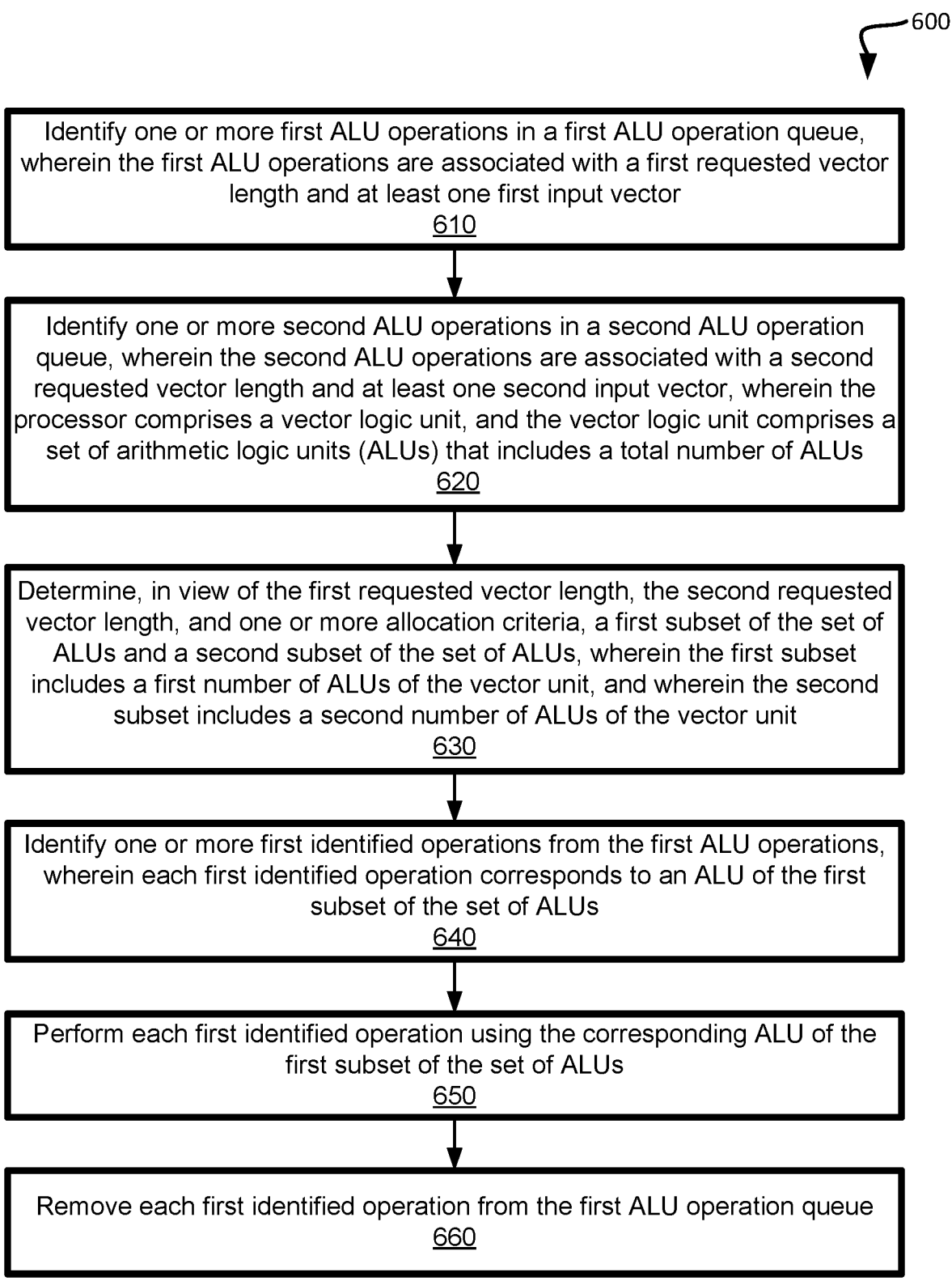
FIG. 6 depicts a flow diagram of an example method for executing vector instructions from multiple processor cores in parallel on a vector arithmetic logic unit (VALU) using ALU operation queues that can store vector operations for execution in subsequent VALU clock cycles, in accordance with one or more aspects of the present disclosure.

FIG. 6 depicts a flow diagram of an example method 600 for executing vector instructions from multiple processor cores in parallel on a vector arithmetic logic unit (VALU) using ALU operation queues that can store vector operations for execution in subsequent VALU clock cycles, in accordance with one or more aspects of the present disclosure. Method 600 and each of its individual functions, routines, subroutines, or operations may be performed by one or more processors of the computer device executing the method. In certain implementations, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processes implementing method 600 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 600 may be performed by processing device 102 of FIG. 1 or by an executable code of a host machine (e.g., host operating system or firmware), a virtual machine (e.g., guest operating system or virtual firmware), an external device (e.g., a PCI device), other executable code, or a combination thereof.

Method 600 may be performed by processing devices of a server device or a client device and may begin at block 610. At block 610, a processing device may identify one or more first ALU operations in a first ALU operation queue, wherein the first ALU operations are associated with a first requested vector length and at least one first input vector. At block 620, the processing device may identify one or more second ALU operations in a second ALU operation queue, wherein the second ALU operations are associated with a second requested vector length and at least one second input vector, wherein the processor comprises a vector logic unit, and the vector logic unit comprises a set of arithmetic logic units (ALUs) that includes a total number of ALUs. At block 630, the processing device may determine, in view of the first requested vector length, the second requested vector length, and one or more allocation criteria, a first subset of the set of ALUs and a second subset of the set of ALUs, wherein the first subset includes a first number of ALUs of the vector unit, and wherein the second subset includes a second number of ALUs of the vector unit.

At block 640, the processing device may identify one or more first identified operations from the first ALU operations, wherein each first identified operation corresponds to an ALU of the first subset of the set of ALUs. At block 650, the processing device may perform each first identified operation using the corresponding ALU of the first subset of the set of ALUs. At block 660, the processing device may remove each first identified operation from the first ALU operation queue. Responsive to completing the operations described herein above with references to block 660, the method may terminate.

Figure 7:
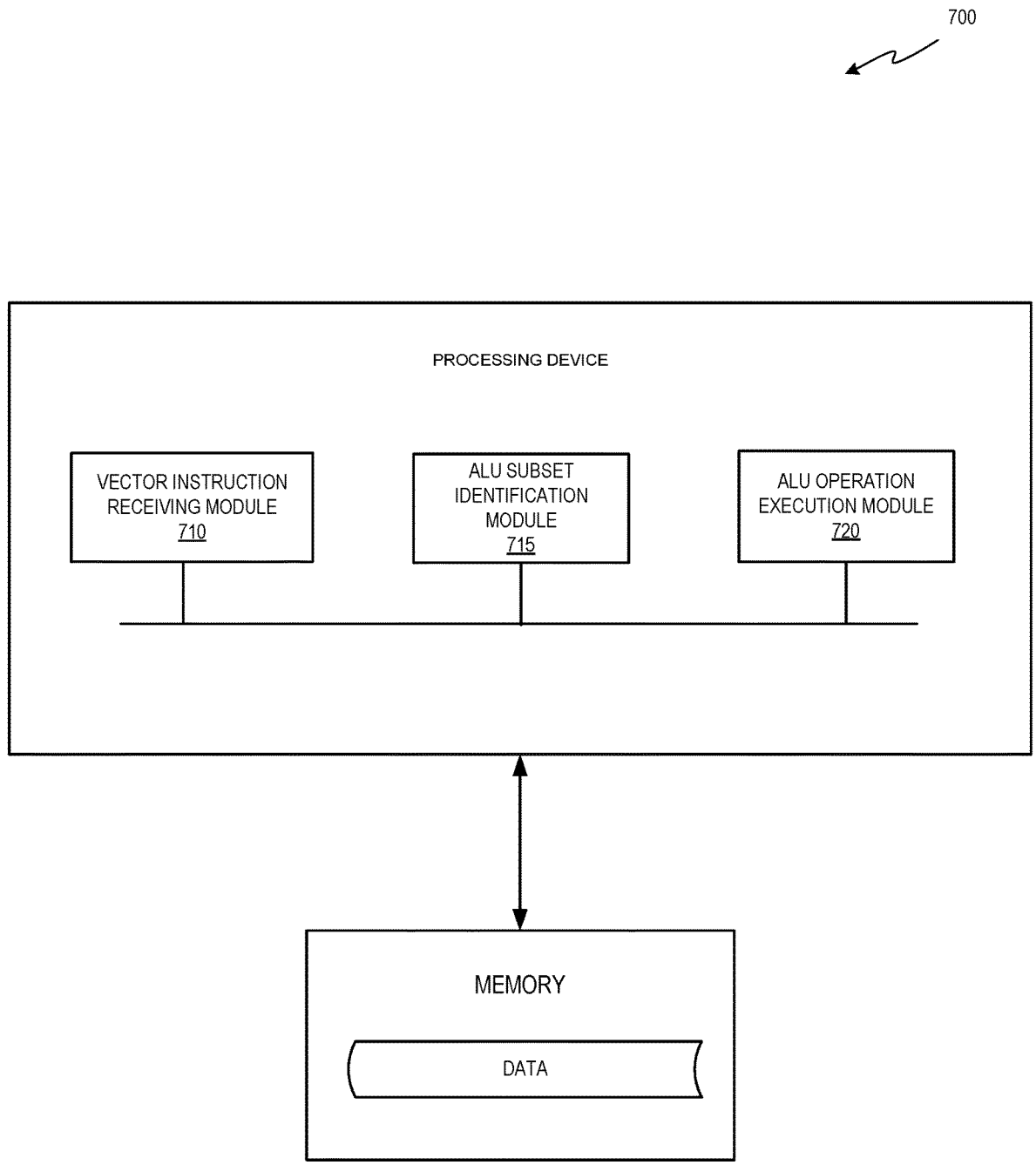
FIG. 7 depicts a block diagram of a computer system operating in accordance with one or more aspects of the present disclosure.

FIG. 7 depicts a block diagram of a computer system 700 operating in accordance with one or more aspects of the present disclosure. Computer system 700 may be the same or similar to computing device 100 of FIG. 1, and may include one or more processors and one or more memory devices. In the example shown, computer system 700 may include a vector instruction receiving module 710, an ALU subset identification module 715, and an ALU operation execution module 720.

Vector instruction receiving module 710 may enable a processor to receive a first vector instruction from a first processor core of a processing device, the first processor core operatively coupled to a vector arithmetic logic unit of the computer system, the vector arithmetic logic unit comprising a plurality of arithmetic logic units (ALUs), wherein the first vector instruction specifies at least one first input vector having a first vector length.

ALU subset identification module 715 may enable the processor to identify a first subset of the ALUs in view of the first vector length and one or more allocation criteria. ALU operation execution module 720 may enable the processor to execute, using the first subset of the set of ALUs, one or more first ALU operations specified by the first vector instruction, wherein the vector arithmetic logic unit executes the first ALU operations in parallel with one or more second ALU operations specified by a second vector instruction received from a second processor core.

Figure 8:
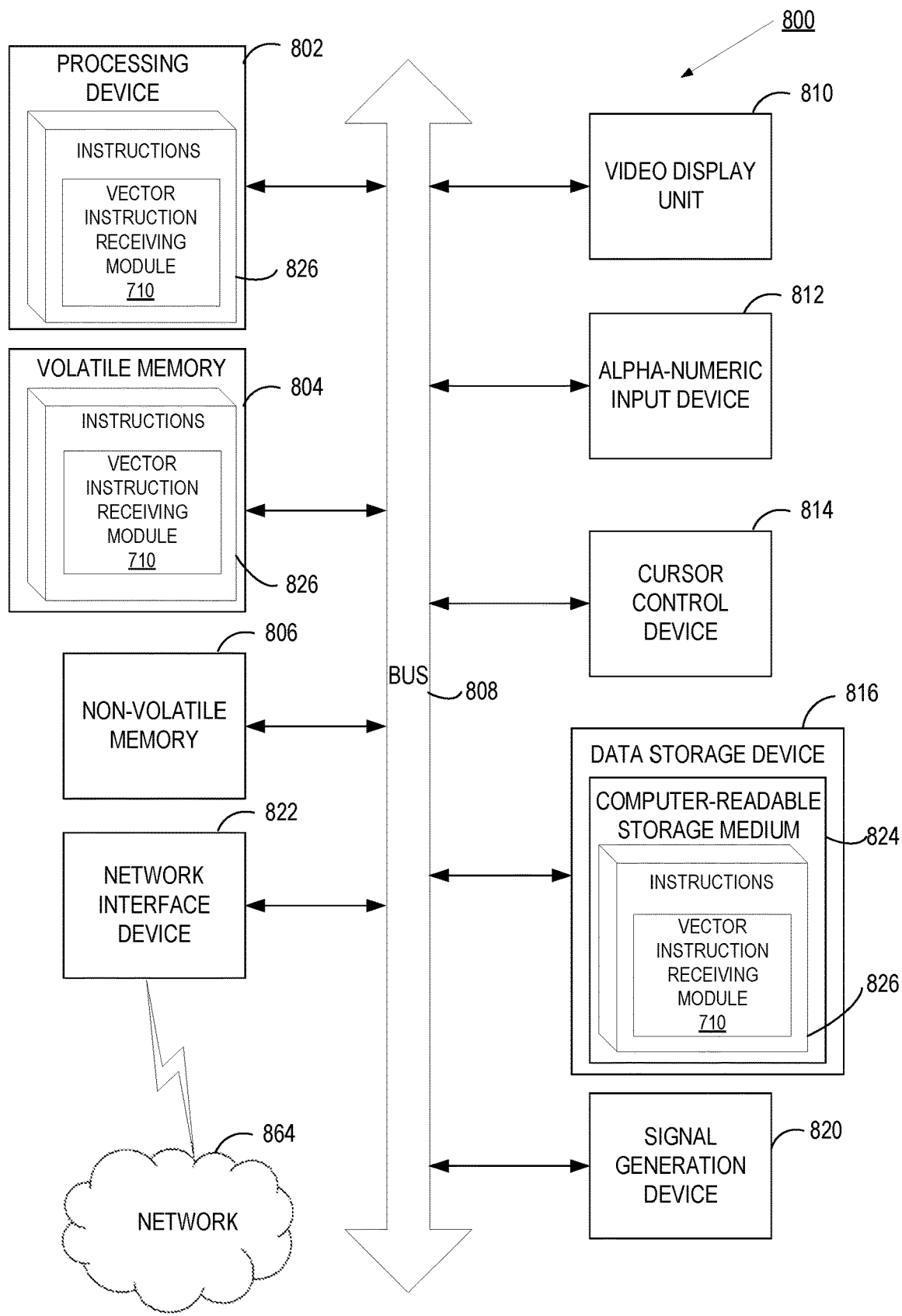
FIG. 8 depicts a block diagram of an example computer system operating in accordance with one or more aspects of the present disclosure.

FIG. 8 depicts a block diagram of a computer system operating in accordance with one or more aspects of the present disclosure. In various illustrative examples, computer system 800 may correspond to processing device 102 of FIG. 1. Computer system 800 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alphanumeric input device 812 (e.g., a keyboard), a cursor control device 814 (e.g., a mouse), and a signal generation device 820.

Data storage device 816 may include a non-transitory computer-readable storage medium 824 on which may store instructions 826 encoding any one or more of the methods or functions described herein, including instructions for implementing method 300, 400, 500, or 600.

Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is a system comprising: a memory; and a processing device operatively coupled to the memory, wherein the processing device comprises: a vector arithmetic logic unit comprising a plurality of arithmetic logic units (ALUs); and a first processor core operatively coupled to the vector arithmetic logic unit, the processing device to: receive a first vector instruction from the first processor core, wherein the first vector instruction specifies at least one first input vector having a first vector length; identify a first subset of the ALUs in view of the first vector length and one or more allocation criteria; and execute, using the first subset of the set of ALUs, one or more first ALU operations specified by the first vector instruction, wherein the vector arithmetic logic unit executes the first ALU operations in parallel with one or more second ALU operations specified by a second vector instruction received from a second processor core.

Example 2 is the system of Example 1, wherein to execute the first ALU operations in parallel with the second ALU operations, the processing device is further to: execute, using a second subset of the set of ALUs, the second ALU operations in a same clock cycle as the first ALU operations.

Example 3 is the system of Example 2, wherein the processing device executes the first ALU operations in a particular clock cycle of the vector arithmetic logic unit, and to execute the second ALU operations in the same clock cycle as the first ALU operations, the processing device is further to: execute the at least one of the second ALU operations in the particular clock cycle.

Example 4 is the system of Example 2, wherein the second vector instruction specifies at least one second input vector having a second vector length, and the processing device further comprises the second processor core, wherein the second processor core is operatively coupled to the vector arithmetic logic unit, and the processing device is further to: identify the second subset of the ALUs in view of the second vector length and the allocation criteria; and execute, using the second subset of the set of ALUs, the one or more second ALU operations specified by the second vector instruction.

Example 5 is the system of Example 4, wherein the first subset of the ALUs executes the first ALU operations in a particular clock cycle, and the second subset of the ALUs executes the second ALU operations in the particular clock cycle.

Example 6 is the system of Example 4, wherein responsive to executing the second ALU operations, the second subset of the ALUs generates a second output vector in view of the second input vector.

Example 7 is the system of Example 6, wherein the first ALU operations cause the first subset of the ALUs to generate a first output vector in view of the first input vector, and the processing device is further to: provide the first output vector to the first processor core; and provide the second output vector to the second processor core.

Example 8 is the system of Example 1, wherein the first vector length is received from a program executing on the first processor core, the first vector length is greater than a number of ALUs in the first subset, and the processing device is further to: determine, in view of a difference between the first vector length and the number of ALUs in the first subset, a first allocated vector length; and provide the first allocated vector length to the program.

Example 9 is the system of Example 1, wherein to identify the first subset of the ALUs in view of the first vector length and the one or more allocation criteria, the processing device is further to: determine whether a sum of the first vector length and a second vector length of a second input vector specified by the second vector instruction received from the second processor core is less than or equal to the total number of ALUs of the vector arithmetic logic unit; and responsive to determining that the sum is less than or equal to the total number of ALUs of the vector arithmetic logic unit: set a number of ALUs in the first subset to the corresponding first vector length; and set a number of ALUs in the second subset to the corresponding second vector length.

Example 10 is the system of Example 1, wherein the allocation criteria comprise a specified Quality of Service associated with the first vector instruction, the total number of ALUs of the vector of the vector arithmetic logic unit, and the first and second vector lengths, wherein the first subset of the ALUs is identified in view of the specified Quality of Service.

Example 11 is the system of Example 10, wherein the Quality of Service comprises a numeric value that corresponds to a QoS level.

Example 12 is the system of Example 1, wherein to identify the first subset of the ALUs in view of the first vector length and one or more allocation criteria, the processing device is further to: determine whether a sum of the first vector length and a second vector length of a second input vector specified by the second vector instruction received from the second processor core is greater than the total number of ALUs of the vector arithmetic logic unit; and responsive to determining that the sum is greater than the total number of ALUs, set the number of ALUs in the first subset to a value less than the first vector length.

Example 13 is the system of Example 12, wherein the allocation criteria comprise a Quality of Service associated with the first vector instruction, the total number of ALUs of the vector arithmetic logic unit, and the first and second vector lengths, and wherein the value less than the first vector length is determined using a resource allocation model in view of the Quality of Service associated with the first vector instruction.

Example 14 is the system of Example 12, wherein at least one of the first ALU operations operation is not allocated to an ALU, and the processing device is further to: defer the at least one of the first ALU operations to a subsequent clock cycle.

Example 15 is the system of Example 14, wherein to defer the at least one of the first ALU operations to the subsequent clock cycle, the processing device is further to include the at least one of the first ALU operations in a first ALU operation queue.

Example 16 is the system of Example 12, wherein responsive to determining that the sum of the first vector length and the second vector length is greater than the total number of ALUs, the processing device is further to set a number of ALUs in the second subset to a value less than the second vector length.

Example 17 is the system of Example 16, wherein the allocation criteria comprise a Quality of Service associated with the second vector instruction, and the value less than the second vector length is determined using a resource allocation model in view of the Quality of Service associated with the second vector instruction.

Example 18 is the system of Example 1, wherein the first vector operation is performed on a first number of elements of the first input vector, wherein the first number of elements corresponds to a number of ALUs in the first subset of ALUs, and the first vector operation is performed on each element of the first input vector by a corresponding one of the first subset of the ALUs.

Example 19 is a method comprising: receiving a first vector instruction from a first processor core of a processing device, the first processor core operatively coupled to a vector arithmetic logic unit of the processing device, the vector arithmetic logic unit comprising a plurality of arithmetic logic units (ALUs), wherein the first vector instruction specifies at least one first input vector having a first vector length; identifying a first subset of the ALUs in view of the first vector length and one or more allocation criteria; and executing, using the first subset of the set of ALUs, one or more first ALU operations specified by the first vector instruction, wherein the vector arithmetic logic unit executes the first ALU operations in parallel with one or more second ALU operations specified by a second vector instruction received from a second processor core.

Example 20 is the method of Example 19, further comprising executing, using a second subset of the set of ALUs, the second ALU operations in a same clock cycle as the first ALU operations.

Example 21 is the method of Example 20, wherein the second vector instruction specifies at least one second input vector having a second vector length, and the processing device further comprises the second processor core, wherein the second processor core is operatively coupled to the vector arithmetic logic unit, the method further comprising: identifying the second subset of the ALUs in view of the second vector length and the allocation criteria; and executing, using the second subset of the set of ALUs, the one or more second ALU operations specified by the second vector instruction.

Example 22 is the method of Example 19, wherein the first vector length is received from a program executing on the first processor core, the first vector length is greater than a number of ALUs in the first subset, the method further comprising: determining, in view of a difference between the first vector length and the number of ALUs in the first subset, a first allocated vector length; and providing the first allocated vector length to the program.

Example 23 is a non-tangible, computer-readable medium storing instructions that, when executed by a processing device, cause the processing device to: receive a first vector instruction from a first processor core of a processing device, the first processor core operatively coupled to a vector arithmetic logic unit of the processing device, the vector arithmetic logic unit comprising a plurality of arithmetic logic units (ALUs), wherein the first vector instruction specifies at least one first input vector having a first vector length; identify a first subset of the ALUs in view of the first vector length and one or more allocation criteria; and execute, using the first subset of the set of ALUs, one or more first ALU operations specified by the first vector instruction, wherein the vector arithmetic logic unit executes the first ALU operations in parallel with one or more second ALU operations specified by a second vector instruction received from a second processor core.

Example 24 is the non-tangible, computer-readable medium of Example 23, wherein the processing device is further to execute, using a second subset of the set of ALUs, the second ALU operations in a same clock cycle as the first ALU operations.

Example 25 is the non-tangible, computer-readable medium of Example 23, wherein the second vector instruction specifies at least one second input vector having a second vector length, and the processing device further comprises the second processor core, wherein the second processor core is operatively coupled to the vector arithmetic logic unit, and the processing device is further to: identify the second subset of the ALUs in view of the second vector length and the allocation criteria; and execute, using the second subset of the set of ALUs, the one or more second ALU operations specified by the second vector instruction.

Example 26 is an apparatus, comprising: means for identifying, by a processor, one or more first ALU operations in a first ALU operation queue, wherein the first ALU operations are associated with a first requested vector length and at least one first input vector; means for identifying, by a processor, one or more second ALU operations in a second ALU operation queue, wherein the second ALU operations are associated with a second requested vector length and at least one second input vector, wherein the processor comprises a vector logic unit, and the vector logic unit comprises a set of arithmetic logic units (ALUs) that includes a total number of ALUs; means for determining, in view of the first requested vector length, the second requested vector length, and one or more allocation criteria, a first subset of the set of ALUs and a second subset of the set of ALUs, wherein the first subset includes a first number of ALUs of the vector unit, and wherein the second subset includes a second number of ALUs of the vector unit; means for identifying one or more first identified operations from the first ALU operations, wherein each first identified operation corresponds to an ALU of the first subset of the set of ALUs; and means for performing each first identified operation using the corresponding ALU of the first subset of the set of ALUs.

Example 27 is the apparatus of Example 26, wherein the first ALU operations are specified by one or more first vector instructions received from a first core of the processor, and wherein the second ALU operations are specified by one or more second vector instructions received from a second core of the processor.

Example 28 is the apparatus of Example 26, wherein a sum of the first number of ALUs and the second number of ALUs is less than or equal to the total number of ALUs in the vector logic unit.

Example 29 is the apparatus of any of Examples 26-28, further comprising: means for removing each first identified operation from the first ALU operation queue.

Example 30 is the apparatus of any of Examples 26-29, wherein the first requested vector length is received from a first program executing on the first core of the processor, the method further comprising: means for providing, to the first program executing on the first processor core, an indication of the number of ALU operations performed on the first input vector, wherein the number of operations performed on the first input vector comprises the number of first identified operations.

Example 31 is the apparatus of any of Examples 26-30, wherein the allocation criteria include a Quality of Service associated with the first ALU operations, wherein the first number of ALUs is determined in view of at least the Quality of Service.

Example 32 is the apparatus of any of Examples 26-31, wherein each first identified operation is performed using the corresponding ALU on a corresponding element of the first input vector.

Example 33 is the apparatus of any of Examples 26-32, further comprising: means for identifying one or more second identified operations from the second ALU operations, wherein each second identified operation corresponds to an ALU of the second subset of the set of ALUs; and means for performing each second identified operation using the corresponding ALU of the second subset of the set of ALUs.

Example 34 is the apparatus of any of Examples 26-33, wherein at least one of the first identified operations and at least one of the second identified operations are performed in the same clock cycle of the vector logic unit.

Example 35 is a method, comprising: receiving a first vector instruction from a program executing on a first core of a processor, the first vector instruction associated with a first vector length that specifies a first number of elements in the first vector; receiving a second vector instruction from a second core of the processor, the second vector instruction associated with a second vector length that specifies a second number of elements in the second vector, wherein the processor comprises a vector logic unit, and the vector logic unit comprises a set of arithmetic logic units (ALUs); determining, in view of the first vector length and the second vector length, a first number of ALUs of the vector logic unit, wherein the first number of ALUs corresponds to a first subset of the set of ALUs; determining, in view of the first vector length and the second vector length, a second number of ALUs of the vector logic unit, wherein the second number of ALUs corresponds to a second subset of the set of ALUs, wherein the first and second sets are disjoint, and wherein a sum of the first and second numbers of ALUs is less than or equal to a total number of ALUs in the set of ALUs; and performing one or more first vector operations specified by the first vector instruction using the first number of ALUs of the vector logic unit, wherein the first vector operations process a number of elements of the first vector, and the number of elements processed corresponds to the first number of ALUs.

Example 36 is the method of Example 35, further comprising: providing, to the program executing on the first core of the processor, the number of elements of the first vector processed by the first vector operations, wherein the number of elements of the first vector processed by the first vector operations is less than the first vector length; receiving, from the program executing on the first core of the processor, a third instruction associated with a third vector length that specifies a third number of elements in the first vector, wherein the third number of elements corresponds to elements of the first vector not processed by the performing of the one or more first vector operations specified by the first vector instruction.

Example 37 is the method of any of Examples 35-36, further comprising: performing one or more second vector operations specified by the third vector instruction using a third number of ALUs of the vector logic unit, wherein the second vector operations process a number of elements of the first vector, and the number of elements processed corresponds to a difference between the first vector length and the number of elements of the first vector processed by the first vector operations.

Example 38 is a method comprising: receiving a first vector instruction from a first core of a processor, the first vector instruction associated with a first vector length; receiving a second vector instruction from a second core of the processor, the second vector instruction associated with a second vector length, wherein the processor comprises a vector logic unit, and the vector logic unit comprises a set of functional units; determining, in view of the first vector length and the second vector length, a first number of functional units of the vector logic unit; determining, in view of the first vector length and the second vector length, a second number of functional units of the vector logic unit, wherein a sum of the first and second numbers of functional units is less than or equal to a total number of functional units in the set of functional units, wherein the first number of functional units corresponds to a first subset of the set of functional units, and the second number of functional units corresponds to a second subset of the set of functional units that is disjoint from the first set; and performing one or more first vector operations specified by the first vector instruction using the first number of functional units of the vector logic unit, wherein the first vector operations process a number of elements of the first vector, and the number of elements processed corresponds to the first number of functional units.

Example 39 is the method of Example 38, wherein at least one of the first vector operations is performed by the vector logic unit in parallel with at least one second vector operation specified by the second vector instruction.

Example 40 is the method of any of Examples 38-39, wherein the at least one of the first vector operations is performed in the same clock cycle of the vector logic unit as the at least one second vector operation.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300, 400, or 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A system comprising:
    a memory; and
    a processing device operatively coupled to the memory, wherein the processing device comprises:
        a vector arithmetic logic unit comprising a plurality of arithmetic logic units (ALUs); and
        a first processor core operatively coupled to the vector arithmetic logic unit, the processing device to:
            identify one or more first requested ALU operations in a first ALU operation queue, wherein the first ALU operations are generated from one or more first vector instructions received from the first processor core;
            identify a first subset of the plurality of ALUs for one or more first ALU operations of the first ALU operations, wherein the first subset is identified in view of one or more allocation criteria based on a priority associated with the first ALU operations and a time factor associated with the first ALU operations; and
            execute, using the first subset of the plurality of ALUs, the first ALU operations, wherein the vector arithmetic logic unit executes the first ALU operations in parallel with one or more second ALU operations specified by a second vector instruction received from a second processor core.

2. The system of claim 1, wherein to execute the first ALU operations in parallel with the second ALU operations, the processing device is further to:
    execute, using a second subset of the plurality of ALUs, the second ALU operations in a same clock cycle as the first ALU operations.

3. The system of claim 2, wherein the processing device executes the first ALU operations in a particular clock cycle of the vector arithmetic logic unit, and to execute the second subset of ALU operations in the same clock cycle as the first ALU operations, the processing device is further to:
    execute the second ALU operations in the particular clock cycle.

4. The system of claim 2, wherein the one or more first vector instructions specify at least one first input vector having a first vector length, the second vector instruction specifies at least one second input vector having a second vector length, and the processing device further comprises the second processor core, wherein the second processor core is operatively coupled to the vector arithmetic logic unit, and the processing device is further to:
    identify the second subset of the plurality of ALUs in view of the second vector length and the allocation criteria; and
    execute, using the second subset of the plurality of ALUs, the second ALU operations specified by the second vector instruction.

5. The system of claim 4, wherein the first subset of the plurality of ALUs executes the first ALU operations in a particular clock cycle, and the second subset of the plurality of ALUs executes the second ALU operations in the particular clock cycle.

6. The system of claim 1, wherein the allocation criteria is further based on a number of deferred ALU operations that have previously been executed.

7. The system of claim 6, wherein the first ALU operations cause the first subset of the plurality of ALUs to generate a first output vector in view of a first input vector specified by the one or more first vector instructions, and the processing device is further to:
    provide the first output vector to the first processor core; and
    provide a second output vector to the second processor core.

8. The system of claim 1, wherein a first vector length is received from a program executing on the first processor core, the first vector length is greater than a number of ALUs in the first subset of the plurality of ALUs, and the processing device is further to:

determine, in view of a difference between the first vector length and the number of ALUs in the first subset of the plurality of ALUs, a first allocated vector length; and provide the first allocated vector length to the program.

9. The system of claim 1, wherein the first subset of the plurality of ALUs comprises one or more ALUs that are available to execute the first ALU operations.

10. The system of claim 1, wherein the allocation criteria comprise a specified Quality of Service associated with each of the first ALU operations, each specified Quality of Service is one of low, medium, or high, and the allocation criteria further specify that a particular ALU operation is included prior to including another ALU operation having a medium or low quality of service in the first subset if the particular ALU operation has been deferred.

11. The system of claim 10, wherein the allocation criteria further specify that the particular ALU operation having a medium quality of service is included prior to including another ALU operation having a medium quality of service if fewer medium quality of service ALU operations have been executed than deferred operations.

12. The system of claim 1, wherein the processing device is further to: identify the first subset of the plurality of ALUs in view of a first vector length specified by the one or more first vector instructions and the one or more allocation criteria, and to identify the first subset of the plurality of ALUs, the processing device is further to:

determine whether a sum of the first vector length and a second vector length of a second input vector specified by the second vector instruction received from the second processor core is greater than a total number of ALUs of the vector arithmetic logic unit; and
    responsive to determining that the sum is greater than the total number of ALUs, set a number of ALUs in the first subset to a value less than the first vector length.

13. The system of claim 12, wherein the allocation criteria comprise a Quality of Service associated with the one or more first vector instructions, the total number of ALUs of the vector arithmetic logic unit, and the first and second vector lengths, and
    wherein the value less than the first vector length is determined using a resource allocation model in view of the Quality of Service associated with the one or more first vector instructions.

14. The system of claim 12, wherein at least one of the first ALU operations is not allocated to an ALU, and the processing device is further to:
    defer the at least one of the first ALU operations to a subsequent clock cycle.

15. The system of claim 14, wherein to defer the at least one of the first ALU operations to the subsequent clock cycle, the processing device is further to include the at least one of the first ALU operations in the first ALU operation queue.

16. The system of claim 12, wherein responsive to determining that the sum of the first vector length and the second vector length is greater than the total number of ALUs, the processing device is further to set a number of ALUs in a second subset of the plurality of ALUs to a value less than the second vector length.

17. The system of claim 16, wherein the allocation criteria comprise a Quality of Service associated with the second vector instruction, and the value less than the second vector length is determined using a resource allocation model in view of the Quality of Service associated with the second vector instruction.

18. The system of claim 1, wherein the one or more first vector instruction are performed on a first number of elements of a first input vector, wherein the first number of elements corresponds to a number of ALUs in the first subset of the plurality of ALUs, and the one or more first vector instructions are performed on each element of the elements of the first input vector by a corresponding one of the first subset of the plurality of ALUs.

19. A method comprising:
    identifying one or more first requested arithmetic logic unit (ALU) operations in a first ALU operation queue, wherein the first ALU operations are generated from one or more first vector instructions received from a first processor core;
    determining that a plurality of ALUs included in a vector arithmetic logic unit is insufficient to execute the first ALU operations;
    identifying a first subset of the plurality of ALUs for one or more first ALU operations from the first ALU operations, wherein the first subset is identified in view of one or more allocation criteria based on a priority associated with the first ALU operations and a time factor associated with the first ALU operations; and
    execute, using the first subset of the plurality of ALUs, the first ALU operations, wherein the vector arithmetic logic unit executes the first ALU operations in parallel with one or more second ALU operations specified by a second vector instruction received from a second processor core.

20. A non-transitory, machine-readable medium storing instructions that, when executed by a processing device, cause the processing device to:
    identify one or more first requested arithmetic logic unit (ALU) operations in a first ALU operation queue, wherein the first ALU operations are generated from one or more first vector instructions received from a first processor core;
    identify a first subset of a plurality of ALUs included in a vector airthmetic logic unit for one or more first ALU operations from the first ALU operations, wherein the first subset is identified in view of one or more allocation criteria based on a priority associated with the first ALU operations and a time factor associated with the first ALU operations; and
    execute, using the first subset of the plurality of ALUs, the first ALU operations, wherein the vector arithmetic logic unit executes the first ALU operations in parallel with one or more second ALU operations specified by a second vector instruction received from a second processor core.

* * * * *